United States Patent
Susca et al.

(10) Patent No.: US 12,203,491 B2
(45) Date of Patent: Jan. 21, 2025

(54) HYDRAULIC ACTUATOR INCLUDING A MULTI-HEAD PISTON FOR HYDRAULIC GEARING

(71) Applicant: Hamilton Sundstrand Corporation, Charlotte, NC (US)

(72) Inventors: Ryan Prescott Susca, Windsor, CT (US); Morgan O'Rorke, West Hartford, CT (US); Steve Doerner, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 221 days.

(21) Appl. No.: 17/726,734

(22) Filed: Apr. 22, 2022

(65) Prior Publication Data
US 2023/0339604 A1  Oct. 26, 2023

(51) Int. Cl.
*F15B 20/00*    (2006.01)
*B64C 13/50*    (2006.01)
(Continued)

(52) U.S. Cl.
CPC ......... *F15B 20/008* (2013.01); *B64C 13/504* (2018.01); *F15B 1/26* (2013.01);
(Continued)

(58) Field of Classification Search
CPC ........... F15B 20/008; F15B 2211/8752; F15B 2211/30565; B64C 13/42
See application file for complete search history.

(56) References Cited

U.S. PATENT DOCUMENTS 5,206,810 A * 4/1993 Bools ............... G05B 9/03
                                              318/564
5,528,949 A * 6/1996 Stainton ........... F16H 63/3023
                                              74/335

(Continued)

FOREIGN PATENT DOCUMENTS

DE  102011119788 A1  6/2013
EP      3447315 A1   2/2019
EP      4230877 A1   8/2023

OTHER PUBLICATIONS

European Search Report for Application No. 23169607.1, mailed Sep. 14, 2023, 10 pages.

(Continued)

*Primary Examiner* — Thomas E Lazo
(74) *Attorney, Agent, or Firm* — CANTOR COLBURN LLP

(57) ABSTRACT

A hydraulic actuator system of an aircraft includes a hydraulic actuator having a housing with a piston having a piston shaft with a piston head attached thereto and arranged within the housing. The piston head divides in internal volume of the housing into an extend cavity and a retract cavity and the extend cavity is configured to be connected to low pressure fluid source. The system also includes a pressure selector unit fluidly connected to the retract cavity and configured to be connected to the low pressure fluid source and to a high pressure fluid source. The unit include three solenoids with the first and second connected in parallel to the fluid sources and the third solenoid having a third solenoid first input connected to the first solenoid output, a third solenoid second input connected to the second solenoid output, and a third solenoid output connected to the retract cavity.

14 Claims, 3 Drawing Sheets

(51) Int. Cl.
  *F15B 1/26*      (2006.01)
  *F15B 7/00*      (2006.01)
  *F15B 21/0427*   (2019.01)

(52) U.S. Cl.
  CPC .......... *F15B 7/006* (2013.01); *F15B 21/0427* (2019.01); *F15B 2211/20515* (2013.01); *F15B 2211/20538* (2013.01); *F15B 2211/20561* (2013.01); *F15B 2211/27* (2013.01); *F15B 2211/3058* (2013.01); *F15B 2211/411* (2013.01); *F15B 2211/4159* (2013.01); *F15B 2211/6343* (2013.01); *F15B 2211/6651* (2013.01); *F15B 2211/8752* (2013.01)

(56) References Cited

U.S. PATENT DOCUMENTS

| | | | |
|---|---|---|---|
| 5,561,976 A * | 10/1996 | Chu .................. | F02C 7/232 60/734 |
| 10,066,651 B2 * | 9/2018 | Sauer .................. | F15B 20/008 |
| 10,577,080 B2 * | 3/2020 | Maver .................. | F15B 20/008 |
| 2015/0152898 A1 * | 6/2015 | Banay .................. | F01D 21/00 60/403 |
| 2016/0062368 A1 * | 3/2016 | Wagner-Stuerz ...... | G05B 15/02 700/282 |
| 2017/0051768 A1 | 2/2017 | Sauer et al. | |
| 2019/0061916 A1 * | 2/2019 | Maver .................. | F15B 20/008 |

OTHER PUBLICATIONS

European Office Action for Application No. 23169607.1, mailed Nov. 20, 2024, 9 pages.

\* cited by examiner

HYDRAULIC ACTUATOR INCLUDING A MULTI-HEAD PISTON FOR HYDRAULIC GEARING

BACKGROUND

The following description relates to hydraulic actuators and, more particularly, to a hydraulic actuator system that includes an actuator with multiple piston heads.

Hydraulic actuators find many applications, particularly in controlling movement of a moveable component. In aircraft, many moveable components and surfaces are moved by means of a hydraulic actuator. In general terms, a hydraulic actuator comprises a cylindrical housing in which is mounted an axially moveable piston rod. A head of the rod, inside the housing, divides the housing into two chambers each having a fluid port via which pressurized fluid can be injected into the chamber or low-pressure fluid exits the chamber, so as to change the relative pressure in the two chambers either side of the piston head, thus causing movement of the piston relative to the housing. A free end of the piston rod that extends out of the housing is attached to a component or surface to be moved.

In some cases, the actuators can be so called modulated systems where the piston provides variable force to the load. In such cases, a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator. The movement is controlled by an electrohydraulic servo valve (EHSV). EHSV's are known in the art.

BRIEF DESCRIPTION

According to some aspects of the present disclosure, a hydraulic actuator system of an aircraft is disclosed. The actuator system includes a hydraulic actuator having a housing with a piston having a piston shaft with a piston head attached thereto and arranged within the housing. The piston head divides in internal volume of the housing into an extend cavity and a retract cavity and the extend cavity is configured to be connected to low pressure fluid source. The system also includes a pressure selector unit fluidly connected to the retract cavity and configured to be connected to the low pressure fluid source and to a high pressure fluid source. The pressure selector unit selectively connects the low pressure fluid source or the high pressure fluid source to the extend or retract the piston, respectively. The pressure selector unit includes: a first solenoid having a first solenoid high pressure input configured to the connected to the high pressure fluid source, a first solenoid low pressure input configured to be connected to the low pressure fluid source and a first solenoid output; a second solenoid having a second solenoid high pressure input configured to the connected to the high pressure fluid source, a second solenoid low pressure input configured to be connected to the low pressure fluid source, and a second solenoid output; and a third solenoid having a third solenoid first input connected to the first solenoid output, a third solenoid second input connected to the second solenoid output, and a third solenoid output connected to the retract cavity.

In addition to one or more of the features described above, or as an alternative to any of the foregoing embodiments, the system may include a controller that can cause each of the first, second and third solenoids to be in either an energized or deenergized state.

In addition to one or more of the features described above, or as an alternative to any of the foregoing embodiments, when the first solenoid is in the deenergized state, the first solenoid high pressure input is connected to the first solenoid output and when the first solenoid is in the energized state, the first solenoid low pressure input is connected to the first solenoid output.

In addition to one or more of the features described above, or as an alternative to any of the foregoing embodiments, wherein when the third solenoid is in the deenergized state the third solenoid first input is connected to the third solenoid output.

In addition to one or more of the features described above, or as an alternative to any of the foregoing embodiments, when the second solenoid is in the deenergized state, the second solenoid high pressure input is connected to the second solenoid output and when the second solenoid is in the energized state, the second solenoid low pressure input is connected to the second solenoid output.

In addition to one or more of the features described above, or as an alternative to any of the foregoing embodiments, when the third solenoid is in the energized state the third solenoid second input is connected to the third solenoid output.

In addition to one or more of the features described above, or as an alternative to any of the foregoing embodiments, when in a normal operating mode, the controller has the first and third solenoids in the deenergized state.

In addition to one or more of the features described above, or as an alternative to any of the foregoing embodiments, when the controller determines the first solenoid has failed, the third solenoid is commanded to the energized state.

In addition to one or more of the features described above, or as an alternative to any of the foregoing embodiments, the actuator including a biasing mechanism in the extend cavity that biases the piston in an extend direction.

In addition to one or more of the features described above, or as an alternative to any of the foregoing embodiments, an aircraft system, wherein the piston is configured to actuate a component of the aircraft system.

Also disclosed is an aircraft such as an airplane that includes any prior disclosed system, a high pressure fluid source connected to the first solenoid high pressure input and the second solenoid high pressure input, and a low pressure fluid source connected to the first solenoid low pressure input, the second solenoid low pressure input and the extend cavity.

In addition to one or more of the aircraft features described above, or as an alternative to any of the foregoing embodiments, the aircraft includes an aerodynamic surface and the shaft controls a position of the aerodynamic surface.

Also disclosed is a method of controlling an actuator that includes an extend cavity and a retract cavity separated a piston head connected to a piston shaft. The method includes: fluidly connecting an output of a pressure selector unit to the retract cavity; fluidly connecting inputs of the pressure selector unit to the low pressure fluid source and to a high pressure fluid source and to a high pressure fluid source; fluidly coupling the low pressure fluid source to the extend cavity; selectively coupling the low pressure fluid source or the high pressure fluid source to the retract cavity with a first solenoid to extend or retract the piston; determining that the first solenoid of the pressure selector has failed; controlling a second solenoid of the pressure selector to selectively couple the low pressure fluid source or the high pressure fluid source to the retract cavity to extend or retract the piston; and switching a state of a third solenoid from a first position where the third solenoid passes fluid received from the first solenoid to the retract cavity to a second position where the third solenoid passes fluid received from the second solenoid to the retract cavity.

In addition to one or more of the method features described above, or as an alternative to any of the foregoing embodiments, the solenoid can be connected as described above or hereinafter.

In addition to one or more of the method features described above, or as an alternative to any of the foregoing embodiments, the method can further include connecting the piston shaft to actuate a component of an aircraft system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

When designing an actuator for certain portions of aircraft weight, slew rate, and load capabilities are typically considered. To that end, and as indicated above, many aircraft actuators are modulated actuators when have a controller (EHSV) that switches high and low pressure hydraulic fluid presented on opposing sides of the piston head. While such a configuration may be generally beneficial, in some cases a more simple two-position actuation system can be advantageous as they can reduce weight and take up less space that in places were weight and space are at an even greater premium than previous engines.

Herein is described a system that provides for a two-position actuator. The system can include redundancies to account for possible failures/errors in the control system of the actuator. In one embodiment, the system includes a two position actuator that has a piston disposed therein. One side of a head of the piston is biased by a biasing mechanism and is connected to a low pressure hydraulic fluid source. The system also includes a control system comprised of a combination of three 3-way solenoids. These solenoids can be configured to provide to the other side of the piston head either low pressure hydraulic fluid or high pressure hydraulic fluid. If the fluid is low pressure, the biasing mechanism will drive the piston out of the housing to control a portion of aircraft engine (e.g., fan vanes angle, compressor vane angle, exhaust nozzle area, etc.)

As shown below, rather than using an EHSV as in the prior art, a combination of three 3-way solenoids can be used to control extension or retractation of the piston based on how the three solenoids are commanded.

Figure 1:
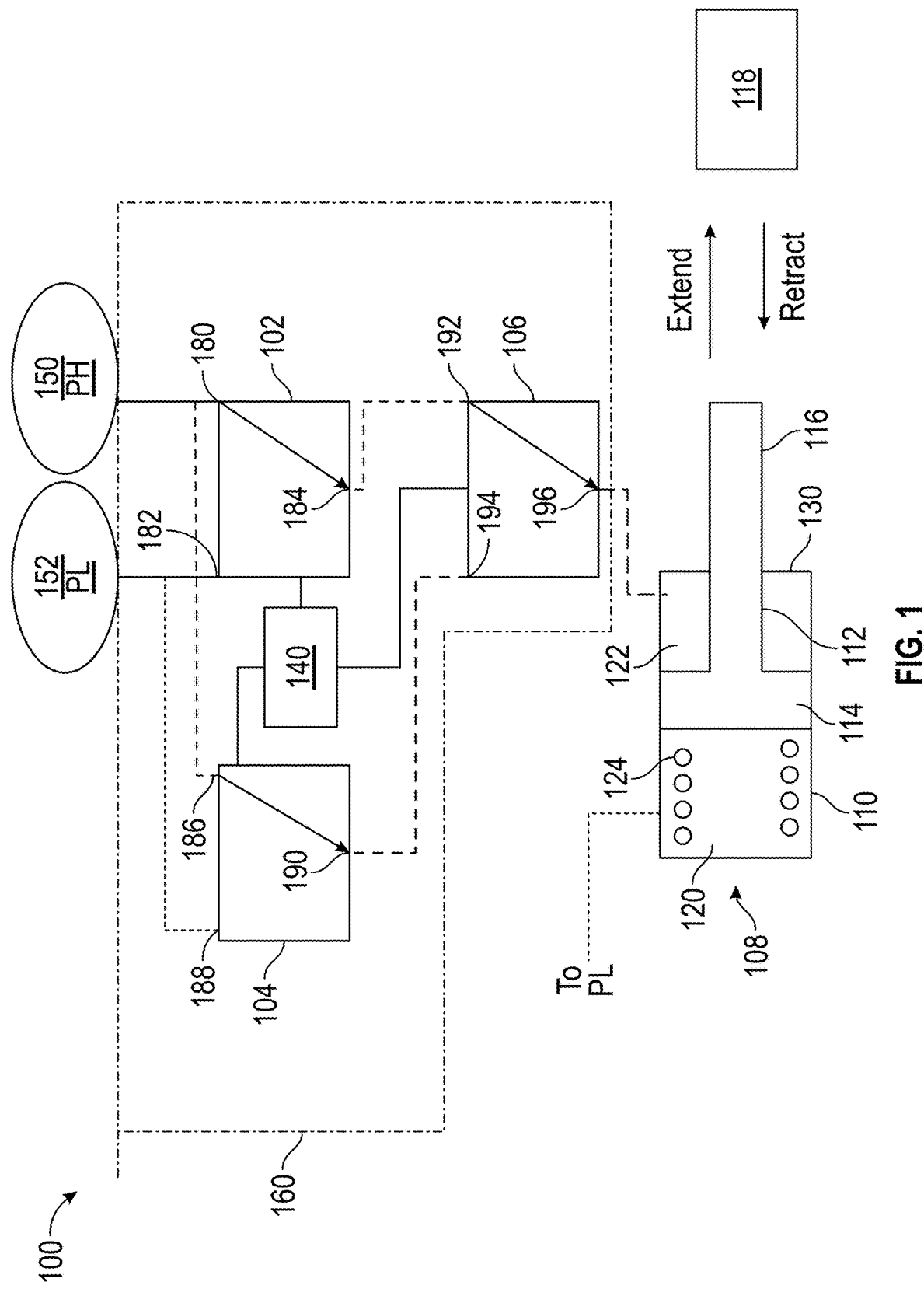
FIG. 1 is a schematic of system according to one embodiment in a first state/mode.

FIG. 1 shows an example of system 100 according to one embodiment. As will be understood, the system 100 is operating in so call "normal" mode and the position of first solenoid 102 of the three solenoids 102, 104, 106 will control the position of the actuator 108.

The actuator 108 includes a body 110 and a piston 112 disposed within the body 110. The piston 112 includes a piston head 114 and a shaft 116 that extends out from the body 110 and be connected to an element 118 to be controlled. The element 118 can be controlled by extension or retraction of the shaft 116 and can include, for example, portions or configurations of an aircraft engine such as fan vanes angle, compressor vane angle, exhaust nozzle area, etc.

The body 110 defines a volume within it. The piston head 114 is configured to have hydraulic and mechanical pressure applied thereto such that the piston head 114 translates or otherwise moves within the housing 110 in either extend or retract directions shown by the arrows in FIG. 1. The piston head 114 divides the volume within the housing 110 into an extend cavity 120 and an retract cavity 122 which are defined on opposite sides of the piston head 114. The extend cavity 120 can also include a biasing mechanism 124 such as a spring disposed therein. The biasing mechanism 124 is optional and generally biases the piston 112 and thus shaft 116 in the extend direction so that in the event of failure (or equal fluid pressures in both cavities 120, 122) the actuator 108 will resolve to the fully extended position (e.g., piston head 114 will contact the terminal end 130 of the housing 110).

The system 100 can be configured in operation so that it connects to a source of high pressure fluid 150 and a source of low pressure fluid 152. These sources can be referred to as PH and PL herein from brevity from time to time herein.

The extend cavity 120 is connected in operation to PL 152. The retract cavity 122 is connected to pressure selector unit 160. The pressure selector unit 160 is comprised of the three solenoids 102, 104, 106. The three solenoids 102, 104, 106 can be connected to and controlled such that either fluid from PH 150 or PL 152 is provided to the retract cavity 122. When fluid from PH 150 is provided to the retract cavity 122, the pressure in the retract cavity 122 exceeds the pressure in the extend cavity 120 and the force provided by the biasing mechanism and the piston 112 retracts. When the pressure from PL 152 is provided to the retract cavity 122, the fluid pressures in both cavities are the same and the biasing mechanism 124 drives the piston in the extend direction. In this manner, the actuator 108 operates as a 2-position actuator that has a fully extended position and a fully retracted position.

Each of the three solenoids 102, 104, 106 includes two inputs and one output. Depending on a control signal provided to a particular solenoid by a controller 140, one of the two inputs will be fluidly coupled to output of the solenoid. The controller 140 is shown as being in the pressure selector unit 160 but it could be in any location as long as it can provide control signals of the solenoids. Further, the connection to the solenoids can also include means for determining that a particular solenoid has failed. This can include using proximity sensors in one embodiment. Such sensors are much smaller that the typical LVDT (linear voltage differential transformer) used to measure the positions of an EHSV.

In more detail, the first solenoid 102 includes a high pressure input 180 connected to PH 150 and a low pressure input 182 connected to PL 152. The first solenoid also includes a first solenoid output 184. Depending on the signal provided to the first solenoid 102 by the controller 140, the first solenoid 102 will either connect the high pressure input 180 to the first solenoid output 184 (as shown in FIG. 1) or the low pressure input 182 to the first solenoid output 184.

Similarly, the second solenoid 104 includes a high pressure input 186 connected to PH 150 and a low pressure input 188 connected to PL 152. The second solenoid 104 also includes a second solenoid output 190. Depending on the signal provided to the second solenoid 104 by the controller 140, the second solenoid 104 will either connect the high pressure input 186 to the second solenoid output 190 (as shown in FIG. 1) or the low pressure input 188 to the second solenoid output 190. The skilled artisan will realize that the inputs of both the first and second solenoids have their inputs connected in parallel and may, thus, be referred to collectively as parallel solenoids.

The third solenoid 106 include a first input 192 and a second input 194 connected, respectively, to the first solenoid output 184 and the second solenoid output 190. The third solenoid 106 also include a third solenoid output 196. Depending on the signal provided to the third solenoid 106 by the controller 140, the third solenoid 106 will either connect the first solenoid output 184 to the third solenoid output 196 (as shown in FIG. 1) or the second solenoid output 190 to the third solenoid output 196. The third solenoid output 196 is connected to the retract cavity 122. Thus, the third solenoid 106 controls which of the first two parallel solenoids provides fluid to the retract cavity 122.

The configuration of connections shown herein allows for any one of the solenoids to fail and the pressure selector unit 160 to operate correctly.

As in known in the art, solenoids have default or "deenergized" position/state. Application of power (e.g., a control signal) will move the solenoid to other position (e.g., a powered/energized position/state). In the following example, it shall be assumed that default position is to have the first input of each solenoid connected to its output (e.g., PH connected to a particular output). Thus, for example, the default position shown in FIG. 1 for the third solenoid 106 connects the first solenoid output 184 to the retract cavity 122. In this manner, the third solenoid 106 can be thought to "follow" the first solenoid 102. This choice is, however, not required and the third solenoid 106 could follow the second solenoid 104 without departing from the teachings herein. Further, while the de-energized states are shown in FIG. 1, the states could be reversed depending on how the actuator 108 is configured and the desired "failed" state that is assumed if power is lost to the solenoids 102, 104, 106.

Figure 2:
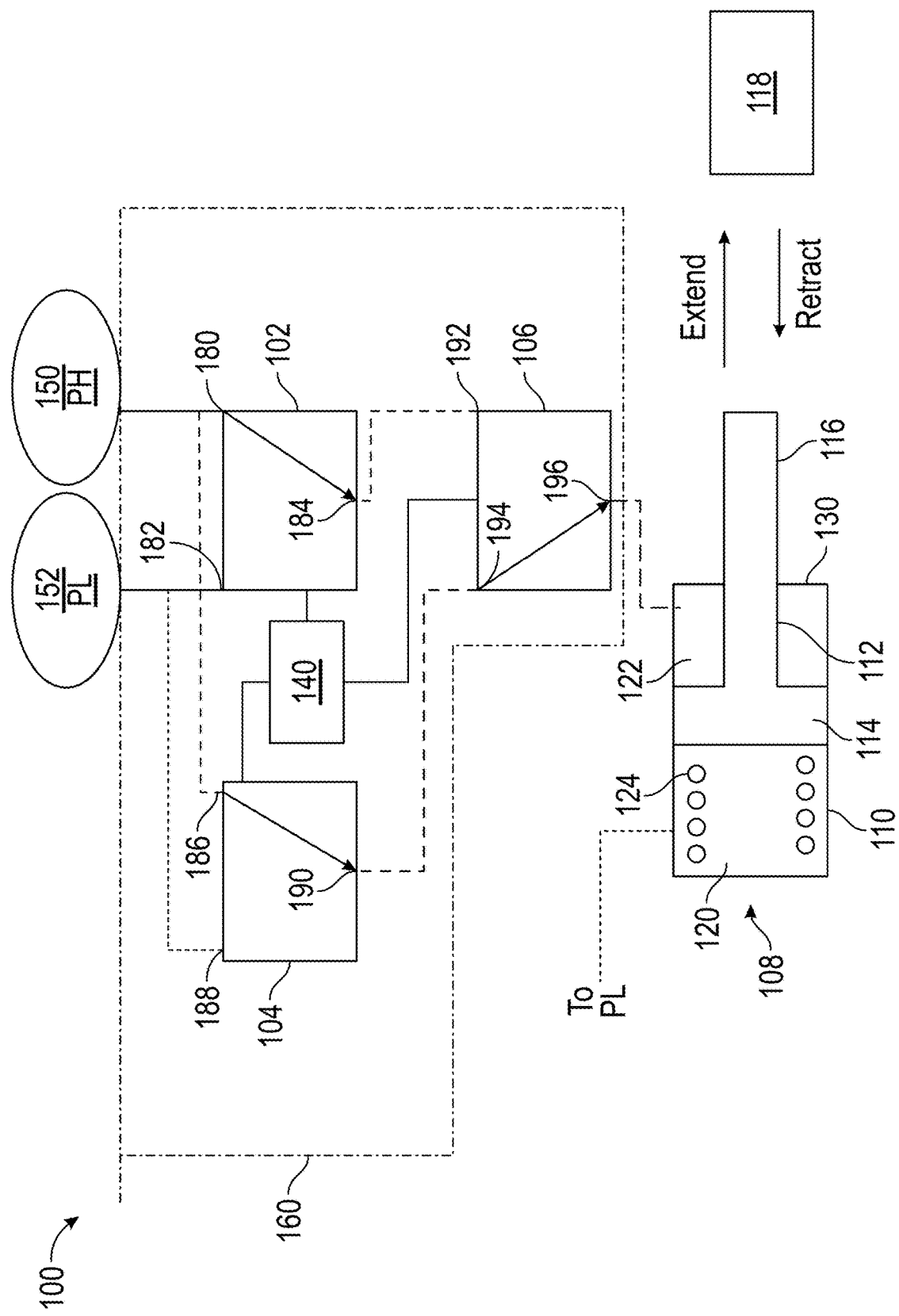
FIG. 2 is a schematic of system according to one embodiment in a second state/mode.

Consider the case where third solenoid 106 follows the first solenoid 102 and the first solenoid 102 fails. In such a case, the third solenoid 106 can be switched to the other position (energized in this example) so that it follows the second solenoid 104. Such a configuration is shown, for example, in FIG. 2.

Now consider the case where the third solenoid 106 follows the second solenoid 104. In such a case, the third solenoid 106 can be switched to the other position (de-energized in this example) so that it follows the first solenoid 102.

There are two failure modes that can occur for the third solenoid 106. If it fails in the normal state, the first solenoid 102 can be used to control the actuator 108. Alternatively, if the third solenoid 106 fails in the energized state (e.g., gets stuck) second solenoid 104 can be used to control the actuator 108. That is, if the third solenoid 106 fails, solenoid (first or second solenoids 104, 106) selected by the third solenoid 106 failure position will retain control of the actuator 108.

Based on the disclosure herein it shall be realized that for engines with weight, envelope, fuel system efficiency or reliability issues the disclosed actuator can provide one or more of following benefits (provided they trade favorably with the reduced performance of a non-modulated actuator): Reduced weight/envelope (solenoids are smaller/lighter than EHSVs and proximity sensors are much smaller than LVDTs); Reduced internal leakage (solenoids have little/no internal leakage compared to EHSVs); Increased reliability (e.g., increased Mean time between failures); Simplified control method and I/O requirements.

Figure 3:
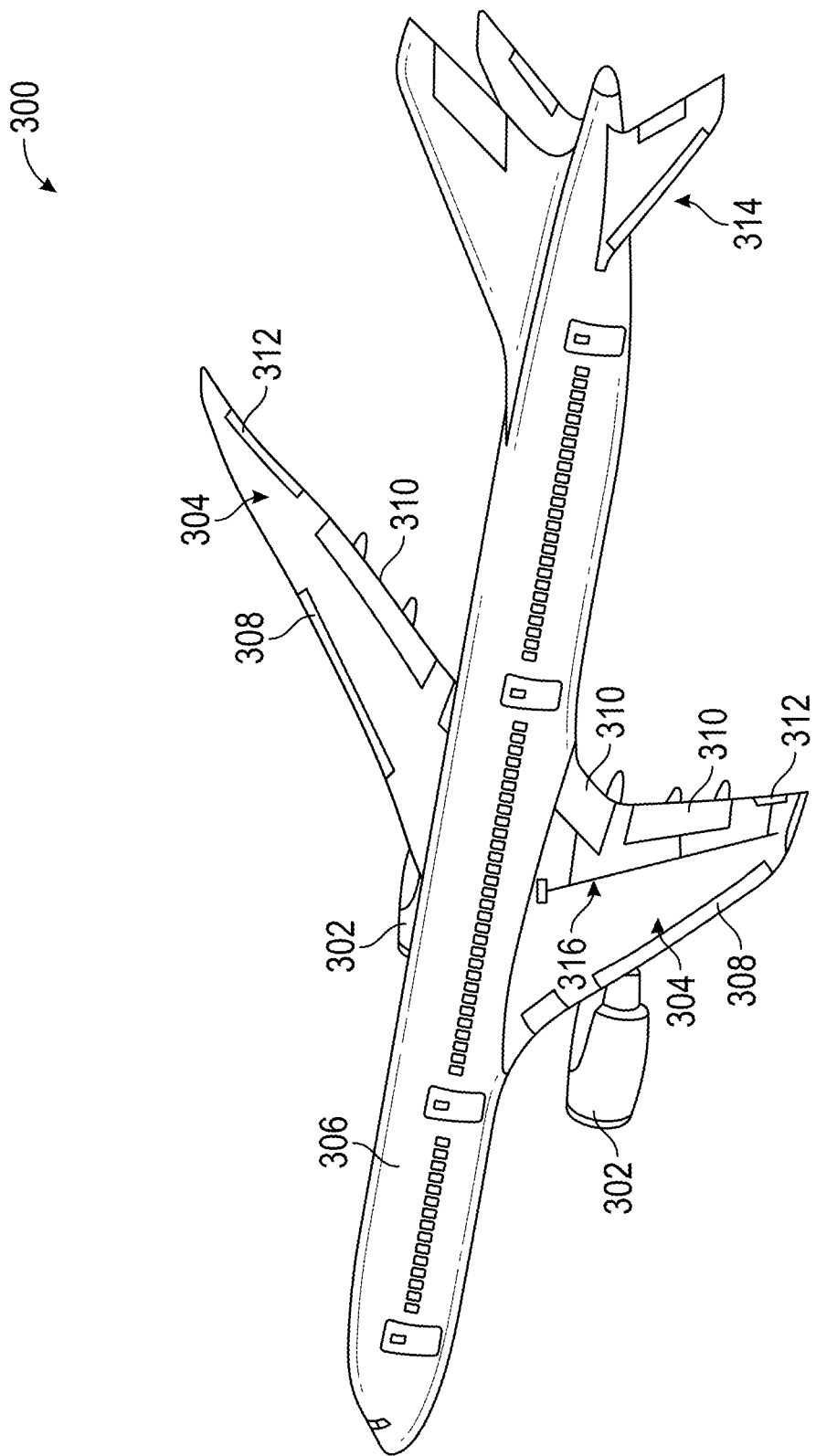
FIG. 3 shows an example aircraft that can include the systems disclosed herein.

FIG. 3 illustrates an example of an aircraft 300 on which various embodiments can be implemented. The illustrated aircraft includes aircraft engines surrounded by (or otherwise carried in) nacelles 302. The aircraft 300 includes wings 304 that extend from an aircraft fuselage 306. Each wing 304 may include one or more slats 308 on a forward edge or leading edge and one or more flaps 310 on an aft, rear, or trailing edge thereof. The wings 304 may also include ailerons 312 on the trailing edges, as will be appreciated by those of skill in the art. The aircraft 300, as shown, includes a tail structure 314 which can include various flaps, ailerons, slats, and the like, as will be appreciated by those of skill in the art. The flaps, slats, ailerons, and the like are generally referred to herein as "aerostructures" or "aerodynamic structures" as they are movable under aircraft power systems and are configured to control flight and motion of the aircraft 300. An actuator system 100 disclosed herein may be connected to one or more of the aerostructures and is illustrated by way of example, by reference numeral 316. For example, each wing 304 and the tail structure 314 may include one or more aerostructure actuator systems 316. The aerostructure actuator systems 316 may be operably connected to the various aerostructures and configured control the operation/position of the aerostructures to control flight of the aircraft 300.

Further, the engines of the aircraft 300 may include various actuators and control mechanisms that can incorporate one or more actuator systems such as shown and described above with respect to FIGS. 1-2. In addition, the aircraft 300 can include the source of high pressure fluid 150 and the source of low pressure fluid 152. As such, the described actuator systems of the present disclosure may be incorporated into aircraft engine systems and/or aircraft flight systems. It will be appreciated that such actuator systems as described herein may be used for other purposes onboard aircraft, such as for actuating doors, landing gear, or the like.

The terms "about" and "substantially" are intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A hydraulic actuator system of an aircraft, the actuator system comprising:
    a hydraulic actuator having a housing with a piston having a piston shaft with a piston head attached thereto and arranged within the housing;
    wherein the piston head divides in internal volume of the housing into an extend cavity and a retract cavity, wherein the extend cavity is configured to be connected to a low pressure fluid source;
    a pressure selector unit fluidly connected to the retract cavity and configured to be connected to the low pressure fluid source and to a high pressure fluid source, wherein the pressure selector unit selectively connects the low pressure fluid source or the high pressure fluid source to the extend or retract the piston, respectively, wherein the pressure selector unit includes:
        a first solenoid having a first solenoid high pressure input configured to be connected to the high pressure fluid source, a first solenoid low pressure input configured to be connected to the low pressure fluid source and a first solenoid output;
        a second solenoid having a second solenoid high pressure input configured to be connected to the high pressure fluid source, a second solenoid low pressure input configured to be connected to the low pressure fluid source, and a second solenoid output; and
        a third solenoid having a third solenoid first input connected to the first solenoid output, a third solenoid second input connected to the second solenoid output, and a third solenoid output connected to the retract cavity;
    a controller that can cause each of the first, second and third solenoids to be in either an energized or deenergized state and determine if the third solenoid has failed, wherein when the third solenoid has failed it will be in either a normal state or an energized state;
    wherein the controller is configured to cause the first solenoid to control fluid flow to the actuator when the third solenoid fails in the normal state and to cause the second solenoid to control fluid flow to the actuator when the third solenoid fails in the energized state.

2. The system of claim 1, wherein when the first solenoid is in the deenergized state, the first solenoid high pressure input is connected to the first solenoid output and when the first solenoid is in the energized state, the first solenoid low pressure input is connected to the first solenoid output.

3. The system of claim 2, wherein when the third solenoid is in the deenergized state the third solenoid first input is connected to the third solenoid output.

4. The system of claim 2, wherein when the second solenoid is in the deenergized state, the second solenoid high pressure input is connected to the second solenoid output and when the second solenoid is in the energized state, the second solenoid low pressure input is connected to the second solenoid output.

5. The system of claim 4, wherein when the third solenoid is in the energized state the third solenoid second input is connected to the third solenoid output.

6. The system of claim 5, wherein when in a normal operating mode, the controller has the first and third solenoids in the deenergized state.

7. The system of claim 6, wherein when the controller determines the first solenoid has failed, the third solenoid is commanded to the energized state.

8. The system of claim 1, wherein the actuator includes a biasing mechanism in the extend cavity that biases the piston in an extend direction.

9. The system of claim 1, further comprising an aircraft system, wherein the piston is configured to actuate a component of the aircraft system.

10. An aircraft comprising:
    the system of claim 1;
    a high pressure fluid source connected to the first solenoid high pressure input and the second solenoid high pressure input; and
    a low pressure fluid source connected to the first solenoid low pressure input, the second solenoid low pressure input and the extend cavity.

11. The aircraft of claim 10, wherein the aircraft includes an aerodynamic surface and the shaft controls a position of the aerodynamic surface.

12. A method of controlling an actuator with a system as claimed in claim 1, the method comprising:

fluidly connecting an output of the pressure selector unit to the retract cavity;

fluidly connecting inputs of the pressure selector unit to the low pressure fluid source and to the high pressure fluid source;

fluidly coupling the low pressure fluid source to the extend cavity;

selectively coupling the low pressure fluid source or the high pressure fluid source to the retract cavity with a first solenoid to extend or retract the piston;

determining that the third solenoid has failed, wherein when the third solenoid has failed it will be in either a normal state or an energized state;

causing the first solenoid to control fluid flow to the actuator when the third solenoid fails in the normal state and causing the second solenoid to control fluid flow to the actuator when the third solenoid fails in the energized state.

13. The method of claim 12, wherein:

the first solenoid has a first solenoid high pressure input connected to the high pressure fluid source, a first solenoid low pressure input connected to the low pressure fluid source and a first solenoid output;

the second solenoid has a second solenoid high pressure input connected to the high pressure fluid source, a second solenoid low pressure input connected to the low pressure fluid source, and a second solenoid output; and the third solenoid has a third solenoid first input connected to the first solenoid output, a third solenoid second input connected to the second solenoid output, and a third solenoid output connected to the retract cavity.

14. The method of claim 13, connecting the piston shaft to actuate a component of an aircraft system.

* * * * *